(12) United States Patent
Smith et al.

(10) Patent No.: US 6,394,791 B2
(45) Date of Patent: May 28, 2002

(54) METHOD AND APPARATUS FOR A FUEL-RICH CATALYTIC REACTOR

(75) Inventors: Lance L. Smith, North Haven; Shahrokh Etemad, Trumbull; Marco J. Castaldi, Bridgeport; Hasan Ul Karim, Hamden; William C. Pfefferle, Madison, all of CT (US)

(73) Assignee: Precision Combustion, Inc., North Haven, CT (US)

( * ) Notice: Subject to any disclaimer, the term of this patent is extended or adjusted under 35 U.S.C. 154(b) by 0 days.

(21) Appl. No.: 09/909,517

(22) Filed: Jul. 20, 2001

Related U.S. Application Data

(62) Division of application No. 09/527,708, filed on Mar. 17, 2000.

(51) Int. Cl.[7] .............................................. F42D 14/18
(52) U.S. Cl. ........................ 431/170; 431/326; 431/353; 431/7
(58) Field of Search .......................... 431/5.7, 170, 326, 431/328, 353; 60/299, 301, 723; 422/196, 197, 222; 502/527.11, 527.19, 527.21, 527.24

(56) References Cited

U.S. PATENT DOCUMENTS

| | | | | |
|---|---|---|---|---|
| 4,230,443 A | * | 10/1980 | Berg et al. ...................... | 431/7 |
| 4,354,821 A | * | 10/1982 | Kresselring et al. ........... | 431/7 |
| 4,459,126 A | * | 7/1984 | Krill et al. ...................... | 431/7 |
| 5,235,804 A | * | 8/1993 | Colket, III et al. ........ | 60/39.02 |
| 5,326,252 A | * | 7/1994 | Tonon ......................... | 431/353 |
| 6,174,159 B1 | * | 1/2001 | Smith et al. ................... | 431/7 |

* cited by examiner

Primary Examiner—James C. Yeung
(74) Attorney, Agent, or Firm—McCormick, Paulding & Huber LLP

(57) ABSTRACT

The present invention is a method, and an apparatus for practicing the method, that creates a product stream and a heat of reaction from a fuel-rich fuel/air mixture and then contacts the product stream with a sufficient quantity of additional air to completely combust all of the fuel, to which air a portion of the heat of reaction has been transferred.

18 Claims, 7 Drawing Sheets

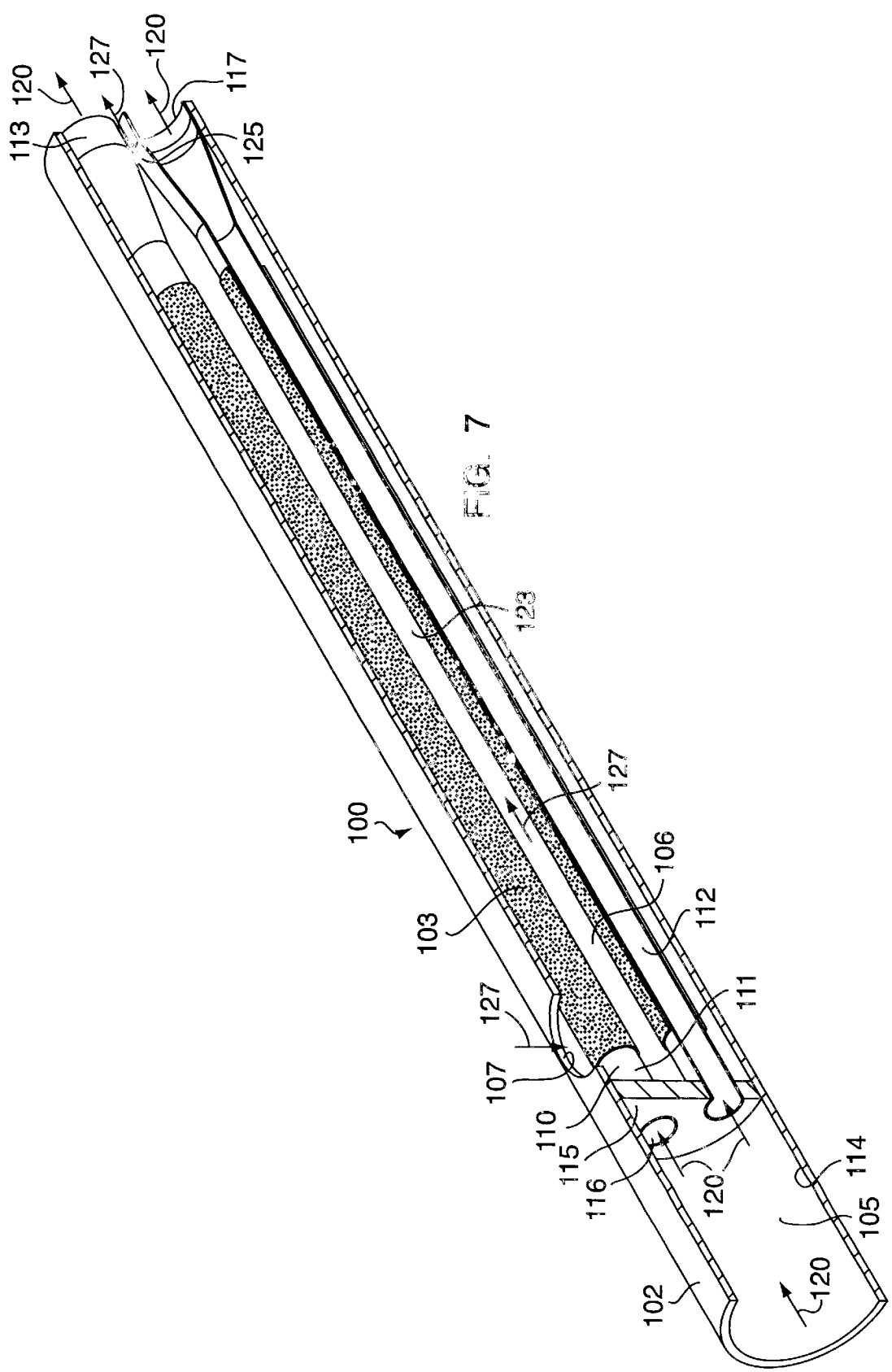

METHOD AND APPARATUS FOR A FUEL-RICH CATALYTIC REACTOR

This application is a Divisional Application of co-pending application 09/527,708 filed on Mar. 17, 2000.

BACKGROUND OF THE INVENTION

1. Field of the Invention

The present invention relates to a catalytic reactor that may be employed in a variety of uses, such as for gas turbine engine combustion, or for other combustion systems. More particularly, the present invention is directed to a method that creates a product stream and a heat of reaction from a fuel-rich fuel/air mixture and then contacts the product stream with a sufficient quantity of additional air to completely combust all of the fuel and to which a portion of the heat of reaction has been transferred.

2. Brief Description of the Related Art

At high temperature, particularly above approximately 2800 degrees F., the oxygen and nitrogen present in air combine to form the pollutants NO and $NO_2$, collectively known as NOx. As flame temperatures of most fuels reacting with air can easily exceed this value, a goal of modern combustion systems is to operate at reduced temperatures, so that such thermal formation of NOx is limited.

Reduced-temperature combustion is typically accomplished by premixing the fuel with sufficient excess air that the flame temperature is reduced to a value at which thermal NOx production is minimal (typically a temperature below approximately 2800 degrees F., At these lower flame temperatures, however, the rate of combustion may be insufficient to prevent localized or global blow-off or extinction, particularly under conditions of turbulent flow. Flame anchoring and flame stability thus become problematic at the lower flame temperatures required for truly low-NOx lean-premixed combustion. Thus, achievable NOx reduction is limited.

A commonly-employed solution to the problems of flame anchoring and flame stability is to react a portion of the fuel at a higher temperature, and to then use the resulting high-temperature gases to initiate, sustain, and stabilize ("pilot") the lower-temperature combustion of the main fuel/air mixture. The higher-temperature "pilot" combustion zone can take various forms, and can be fuel-lean or fuel-rich (the fuel-rich pilot case is typically known as Rich-burn/Quench/Lean-burn or RQL combustion). In either case, undesirable NOx generation results from operation of the pilot. For the fuel-lean case, NOx generation occurs within the pilot flame as a result of the high flame temperature required for stable pilot operation. For the fuel-rich case, the oxygen-deficiency of the pilot's fuel-rich environment is not favorable to NOx formation within the pilot; however, NOx generation occurs when the high-temperature highly-reactive mixture exiting the pilot contacts (and reacts with) the additional air required to complete combustion of the fuel.

An alternative method of stabilizing combustion, without high-temperature piloting, is to employ a catalyst. Because a catalyst allows stable low-temperature reaction of fuel and air, all or a portion of the fuel can be reacted at a moderate temperature without NOx generation. The pre-reaction of a portion of the fuel stabilizes the main combustion process by providing preheat, reactive species from fuel partial oxidation or fragmentation, or both. This type of system is referred to herein as "catalytically stabilized combustion," or simply "catalytic combustion."

While the effectiveness (stability and low pollutant emissions) of catalytic combustion is well documented and well known in the art, commercial development of catalytic combustion requires resolution of unique new design issues introduced by the catalytic reactor. Dominant among these issues is the need to operate the catalyst at a safe temperature.

For example, in gas turbine engine applications having high turbine inlet temperatures, the adiabatic flame temperature of the final fuel/air mixture generally exceeds catalyst and/or substrate material temperature limits. Accordingly, there is a need to control and limit catalyst operating temperature to a value below the final adiabatic flame temperature. Thus, only a portion of the total fuel can be reacted in the catalyst bed. For high thermal efficiency in a heat engine, such as a gas turbine engine, such control and limitation of catalyst operating temperature must occur without net heat extraction from the engine's working fluid.

While it is possible to stage the fuel injection, so that only a portion of the fuel passes through the catalyst bed (with the remainder being injected downstream), issues arise of fuel injection and mixing in the hot-gas path downstream of the catalyst. Thus, it is generally considered preferable to pass all of the fuel through the catalyst bed. Such use of a single fuel stage, however, requires some means of ensuring only partial combustion of the fuel passing through the catalyst bed. Depending upon catalyst operating conditions, additional means of limiting the catalyst operating temperature may also be required, such as catalyst cooling by combustion air or fuel or both.

One approach to limiting combustion of the fuel/air mixture in the catalyst bed is presented in U.S. Pat. No. 5,235,804 (to Colket et al.). The '804 patent teaches partially reacting the fuel in a fuel-rich fuel/air mixture in the catalyst bed, the reaction being limited by an insufficiency of oxygen to completely convert all the fuel to $CO_2$ and $H_2O$. In the '804 patent, the catalytic reaction is intended to provide both flame stability enhancement to the primary (gas-phase) combustion zone and a means for thermal management. Thermal management means that a portion of the heat of catalytic reaction is extracted from the combustion system, permitting a reduction of the flame temperature in the primary combustion zone, and consequently a reduction in NOx formation.

Because a primary goal of the '804 patent's system is to reduce flame temperature in the primary combustion zone by extracting a portion of the heat of reaction before the primary combustion zone, a key feature of this system is the use of a bypass air stream to provide the oxygen required for combustion completion in the primary combustion zone. This bypass air stream does not obtain heat from the heat of reaction within the catalytic oxidation stage. Thus, a third stream is required for catalyst cooling.

The need for separate cooling and combustion air streams introduces several disadvantages. For example, in a gas turbine engine operating with a turbine inlet temperature at or only slightly lower than the maximum combustion temperature for low NOx emissions, low NOx operation requires that virtually all the compressor air enter the primary combustion zone to limit combustion temperature, with little or no dilution air added to the combustor effluent before the turbine. Thus, little or no compressor air would be available for catalyst cooling in the '804 system. If sufficient cooling air were made available to the catalyst, the turbine inlet temperature would be limited to a value significantly lower than the maximum low-NOx combustion temperature by addition of this cooling air downstream of combustion. Alternatively, catalyst cooling air could exit the system without passing through the turbine, resulting in a system loss of the heat of reaction extracted by the catalyst cooling stream, and a loss of engine efficiency.

In either case, the catalyst cooling air, which will be in close contact with the catalyzed fuel/air mixture during cooling, must be directed around the primary combustion zone while the catalyzed fuel/air mixture is directed into the primary combustion zone. The bypass air must be directed around the catalyst bed and then into the primary combustion zone. While this routing is not prohibitive, it does introduce hardware complexity, space requirements, and design challenges to the overall combustion system.

It has now been found that a system employing a fuel-rich catalytic reaction, with transfer of a portion of the heat of reaction to the ultimate combustion air stream (not to a separate cooling stream), can provide low-NOx combustion with enhanced combustion stability along with well-moderated catalyst operating temperatures and complete use of the fuel heating value. By utilizing the ultimate combustion air for catalyst cooling, sufficient cooling air is ensured regardless of the final burner outlet temperature (or turbine inlet temperature in a gas turbine engine).

SUMMARY OF THE INVENTION

The present invention is a method, and an apparatus, for reacting a mixture of fuel and oxidizer (a "fuel/oxidizer mixture"). The invention was developed using a hydrocarbon fuel and air, which contains the oxidizer oxygen, therefore for clarity of presentation of the invention the more conventional fuel/air terminology ("fuel/air mixture") will be used, but the invention should not be considered so limited.

The term "equivalence ratio" is used to denote the proportions of fuel and air in a fuel/air mixture. The equivalence ratio is the ratio of the actual fuel/air ratio to the stoichiometric fuel/air ratio, where the stoichiometric coefficients are calculated for the reaction giving full oxidation products $CO_2$ and $H_2O$. An equivalence ratio greater than 1.0 defines a fuel-rich fuel/air mixture, and an equivalence ratio less than 1.0 defines a fuel-lean fuel/air mixture.

In the basic method of the present invention, a fuel-rich fuel/air mixture is contacted with a catalyst to oxidize a portion of the fuel contained therein. The catalytic reaction provides both a heat of reaction and a product stream. A portion of the heat of reaction is conducted to a cooling air stream and the product stream then contacted with the heated cooling air. The term product stream as used herein means the effluent from the fuel-rich fuel oxidation process comprising the remaining fuel values after reaction of the entering fuel/air mixture, where the remaining fuel values can include residual fuel (entering fuel unchanged) and/or fuel partial oxidation products (entering fuel partially oxidized but less than fully combusted).

As recognized in the art, hydrocarbons and most other fuels have a limited range of fuel/air ratios within which a flame can propagate. The rich flammability limit is the highest equivalence ratio for flame combustion and the lean flammability limit is the lowest. As is known, these limits typically widen with increase in mixture temperature. The catalytic reaction of the present invention, unlike flame combustion, is not limited to equivalence ratios within the flammability limits.

Thus fuel-rich equivalence ratios of ten or higher may be utilized in the present invention. An equivalence ratio of 10, however, seems to be a practical maximum beyond which little heat output is obtained from the catalytic reactor. In the method of the present invention the fuel/air mixture in contact with the catalyst is fuel rich and thus the amount of oxygen available, determined by the equivalence ratio of the fuel-rich fuel/air mixture, limits the extent of reaction and heat release possible. An equivalence ratio of no more than about 5 is usually preferred. At very high equivalence ratios, greater than 10 for example, carbon may accumulate on some catalyst types, in which case periodic regeneration may be required to burn off accumulated carbon.

Because the product stream composition may vary depending upon catalyst selectivity ($H_2$ and CO versus $H_2O$ and $CO_2$), the amount of fuel converted for a given amount of oxygen consumed depends on catalyst selectivity. Thus, for the purposes of this invention conversion within the catalytic reactor, unless otherwise stated, refers to the fraction of oxygen within the fuel-rich fuel/air mixture consumed prior to the mixture's exit from the catalytic reactor.

It is a requirement of the method that a portion of the heat of reaction be conducted into a cooling fluid stream thereby causing a temperature rise in the cooling fluid. Common methods of accomplishing this heat transfer are by a heat exchanger within or downstream of the catalyst zone or by backside cooling of the catalyst. Backside cooling is a technique whereby the catalyst is on one side of a substrate and the cooling fluid stream is brought into contact with the other side of the substrate.

Backside cooling allows the catalyst to operate at a temperature lower than the adiabatic flame temperature of the fuel-rich fuel/air mixture, even when the catalytic reactor is operated in a mass transfer limited regime, and thus is useful for controlling the temperature of catalyst and substrate materials having maximum operating temperatures lower than the reaction mixture's adiabatic flame temperature. Backside cooling is not needed for oxidation of fuel/air mixtures having adiabatic flame temperatures less than the safe operating temperature of the catalyst employed. A catalytic reactor is said to operate in a mass transfer limited regime when the catalytic reaction rate is sufficiently fast that the net rate of conversion of reactants is limited by mass transfer of reactants from the bulk fluid stream to the catalyst surface. For a fluid stream with an effective Lewis number near unity (ratio of thermal diffusivity to mass diffusivity), a catalyst surface operating in a mass transfer limited regime will reach temperatures near the adiabatic flame temperature of the reaction mixture unless cooling is provided.

It is also a requirement of the method that the cooling fluid stream be of sufficient flow rate that if it were mixed with the product stream the resulting mixture would be a fuel-lean fuel/air mixture. If desired additional air may be added with the cooling stream to form the fuel-lean fuel/air mixture. In the method air performs two functions. As a first fluid it provides an oxidizer to support the catalytic combustion of the fuel, and as a cooling fluid it acts as a heat sink. The first fluid and the cooling fluid can be from different sources or from a common source, such as a third fluid from which is separated the first fluid and the cooling fluid.

After catalytic reaction of the fuel/air mixture stream, the product stream and the cooling fluid stream are brought into contact. After contact, several alternate steps are possible. The first alternative after contact is to mix the product stream and the cooling stream to create a fuel-lean fuel/air mixture. Mixing is defined herein to mean that the two components, product steam and cooling stream, are made into a single collection, to the mixedness desired, prior to inflammation.

The inflammation limitation does not mean that inflammation is entirely prohibited during mixing, but instead means that chemical reactions or isolate inflammation may be present, but not to a degree that would cause an all consuming inflammation with substantial reaction of the product stream's remaining fuel values.

While isolate inflammation is allowable, for minimum NOx formation it is preferred that such isolate inflammation be negligible or absent. Pre-inflammation reactions, occurring in the gas-phase but at slow rates and low temperatures compared to actual inflammation, do not impact NOx and may be present during mixing as a result of the catalyst effluent's high reactivity.

It is a significant discovery that high-temperature, non-premixed burning can be prevented, without net heat extraction from the combustion system, during the mixing of a partially-combusted mixture with air for final combustion. Non-catalytic attempts at similar processes (particularly RQL, Rich-burn/Quench/Lean-burn combustion) have required high temperatures to support gas-phase reaction during the fuel-rich partial combustion process, and have consequently been unable to prevent high-temperature burning during the subsequent mixing process. In the present invention, the catalytic reactor's product stream may exit at a significantly lower temperature since oxidation occurs catalytically instead of in the gas-phase, with the result that mixing may occur without burning. However, stability is still imparted to any downstream combustion process, via preheat, the generation of reactive species from fuel partial oxidation or fragmentation, or both.

To ensure that inflammation does not occur during mixing of the product stream with the heated cooling stream, both flameholding and premature auto-ignition should be prevented. Flameholding can be prevented by standard methods known in the art, particularly by ensuring adequate flow velocity and a streamlined flow path (free from recirculation zones) in the region where the product stream and the heated cooling stream mix. Premature auto-ignition is prevented by completing the mixing process in a time that is less than the time for auto-ignition. Thus, both mixing time and auto-ignition delay time must be considered.

Mixing time can be determined by methods known in the art, such as direct measurement, or analytical calculation or computational fluid dynamics (CFD) utilizing models of turbulent flow if appropriate. Auto-ignition delay time is more difficult to determine, but can be estimated based on data and models widely available in the combustion literature. One difficulty is that auto-ignition delay time is generally defined for a fixed equivalence ratio, while mixing processes by definition encompass a wide range of equivalence ratios. Fortunately, however, the dependence of auto-ignition delay time on equivalence ratio is weak, with fuel type (mixture composition), temperature, and pressure being the more determinative factors. Thus, it will be found that by design and in accordance with this disclosure, it is straightforward to achieve such mixing without auto-ignition. The example of the invention disclosed herein demonstrates one application of the method and describes one apparatus for realizing the method.

Depending upon the specific design requirements of the catalytic reactor, to facilitate mixing of the product stream and cooling stream to a fuel-lean fuel/air mixture, interspersion of the two streams may be employed. Interspersion introduces immediate small-scale mixing of the cooling fluid stream with the product stream, and can allow for rapid mixing without inflammation by assuring that mixing occurs in a shorter time than the auto-ignition delay time. The product stream may be subdivided and interspersed into the cooling stream; the cooling stream may be subdivided and interspersed into the product stream; or both may be subdivided and interspersed. Advantageously, the product and cooling streams exit at different velocities to create a highly sheared layer promoting rapid mixing and a high strain rate inhibiting inflammation.

In this method of operation, preferably at least about 50 percent of the heat of reaction is conducted into the coolingy fluid stream. For a backside-cooled catalyst having sufficient cooling fluid flow, this percentage of heat transfer is readily achievable. This heat transfer moderates the temperature of the product stream prior to contact of the product stream with the cooling, fluid stream, advantageously increasing the auto-ignition delay time before inflammation. In this mode of operation, the exiting product stream temperature must be low enough to allow a finite time to achieve mixing prior to inflammation.

As a further step in the method, the fuel-lean fuel/air mixture, if within combustible limits, can be combusted in the gas phase. Whether the fuel-lean fuel/air mixture is within combustible limits will depend on the resulting temperature, composition (absence or presence of partial oxidation products such as $H_2$), and equivalence ratio of the fuel-lean fuel/air mixture. The mixture will be combustible if the equivalence ratio is above the equivalence ratio corresponding to the mixture's lean flammability limit at the mixture temperature. Methods to determine flammability limits are known. Depending upon the degree of oxidation and the amount of the heat of reaction, gas-phase combustion may be achieved through auto-ignition or other ignition source.

A second alternative after contact is to allow inflammation upon contact, without mixing. Unlike the first alternative, this second method of operation does not require an ignition delay prior to complete inflammation. In this method of operation the combustion temperature at the stoichiometric interface between the product stream and the heated cooling fluid stream is advantageously reduced sufficiently to limit NOx production. It has been found that by transferring sufficient heat from the fuel-rich product stream to the cooling air stream before contact, the adiabatic flame temperature at the stoichiometric interface between the product stream and the cooling air stream can be reduced to a value well below the adiabatic flame temperature that would exist at the stoichiometric interface in the absence of heat transfer between the streams. Thus, NOx formation can be limited even if stoichiomeric burning occurs during mixing.

The mechanism for this reduction in stoichiometric interface flame temperature is conduction of heat, but not mass (fuel or oxidizer), between the product stream and the cooling fluid stream. Thus, while the proportions of the product stream and the cooling air stream required to create a stoichiometric mixture are not affected by heat transfer between the streams, the initial temperature (before reaction) of a stoichiometric mixture of the two streams can be significantly lowered; accordingly, the resulting adiabatic flame temperature can also be significantly lowered.

As an example, for the purpose of illustration, let a fuel-rich equivalence ratio only infinitesimally higher than 1.0 be completely reacted in contact with the catalyst, and let sufficient cooling air be provided such that the overall fuel-lean equivalence ratio of the combined product stream and cooling air stream is 0.5. Further, assume that thermal equilibrium between the streams is obtained before the streams contact each other. In this example, the adiabatic flame temperature at the stoichiometric interface between the contacting streams will be nearly equal to the adiabatic flame temperature at 0.5 equivalence ratio, and near-zero NOx emissions will result from stoichiometric burning during mixing. If no heat had been transferred between the streams, however, the adiabatic flame temperature at the stoichiometric interface would not be reduced, and would remain equal to the adiabatic flame temperature for a stoichiometric mixture of the inlet fuel and air.

The adiabatic flame temperature at the stoichiometric interface depends directly on the temperature and composition of the product stream and the heated cooling fluid stream, and thus depends indirectly on the heat of reaction in the catalytic reactor, on the portion of the heat of reaction transferred to the cooling fluid stream, and on the thermal capacity (product of mass flow rate and heat capacity) of each of the two streams. Given these operating conditions, calculation of the adiabatic flame temperature at the stoichiometric interface is straightforward. In particular, one need only calculate, by analytical or numerical methods, the composition and temperature at chemical and thermal equilibrium of a stoichiometric mixture of the product stream and the heated cooling fluid stream. The composition and temperature of the product stream and the heated cooling stream, before mixing and equilibration, can be found either experimentally or by heat and mass transfer calculations (including turbulence modeling if appropriate) standard in chemical engineering practice. Note that for a given fuel-rich equivalence ratio, the heat of reaction in the catalytic reactor will depend on the selectivity of the catalyst to full oxidation products ($C_2O$ and $H_2O$) or partial oxidation products (CO and $H_2$), partial oxidation products providing a lower heat of reaction than full partial oxidation products.

It is a significant discovery that the method of the present invention by conduction of a portion of the heat of reaction to the coolings fluid lowers the adiabatic flame temperature at the stoichiometric interface between the exiting product stream and the exiting heated cooling air. For reduced-NOx operation, stoichiometric interface flame temperatures should be reduced to a value less than about 3300 degrees F., preferably less than about 3100 degrees F., and most preferably less than about 2900 degrees F., temperatures at which NOx formation is greatly reduced. For the situation where about 50 percent of the heat of reaction is conducted to the cooling stream, as may be the case in a backside cooled catalyst system with sufficient cooling air such that an overall equivalence ratio of 0.5 would result upon combining the product stream and cooling fluid stream, calculations show that with methane as fuel and greater than 90 percent oxygen consumed in the catalytic reactor, an inlet temperature of 750 F and a fuel-rich equivalence ratio of 1.5 yields an adiabatic flame temperature below 3300 degrees F at the stoichiometric interface between the product stream and the cooling fluid stream. Similarly, a fuel-rich equivalence ratio of 1.1 yields a stoichiometric interface flame temperature below 2900 degrees F. The calculations also assume catalyst selectivity to the full oxidation products $CO_2$ and $H_2O$, without formation of $H_2$ or CO.

The apparatus of the present invention is designed to perform the previously described method. The apparatus uses conduits adapted for conducting fluid and positioned within a housing. The conduits' fluid conduction defines a cooling path whereas the exterior of the conduits define a flow path within the housing. A catalyst is deposited within the flow path. The conduit exit peripheries define the exit from the flow path and the flow path exits and the conduit exits are collocated and interspersed. While the embodiments depicted herein use elements having circular cross-sections, circular cross-sections are not required and should not be considered limiting unless specifically indicated.

In the first embodiment, a housing is subdivided by a plate into a first and second zone, thereby creating two zones that are not in fluid communication. The housing defines an aperture in fluid communication with the second zone. Conduits are then placed within the housing penetrating through the plate such that the conduit entrances open into the first zone and the conduit exits are in the second zone downstream of the aperture. Upstream and downstream are defined by the normal flow of a fluid through the invention. The exterior surfaces of the conduits define the flow path within the housing. This structure permits the cooling fluid to enter into zone one and pass through the conduits and a fuel/air mixture to enter zone two through the aperture and traverse the flow path. The conduit exits and the flow path exits are collocated and interspersed so that the fluid streams exiting both will mix.

The specific cross-sections and placement of the conduits within the housing define the contours of the flow path. The flow path, however, must allow for the diffusion of the fuel/air mixture entering through the aperture throughout the relevant portion of the housing so the fuel/air mixture can traverse through all relevant downstream areas of the flow path. In an embodiment employing a single aperture, this is accomplished by placing the conduits within the housing such that immediately downstream of the aperture there are gaps between the conduits, a dispersion area, that permit the relatively unrestricted flow of the entering fluid around the conduits. Downstream of the dispersion area the flow path can either be partitioned, unpartitioned, or a combination.

The exit from the flow path and the conduits are collocated and interspersed. This structure introduces immediate small-scale mixing of the cooling fluid stream and the product stream, and permits the two flows to mix naturally by such mechanisms as entrainment and interspersion. The flow path exit, or exits, is defined by the conduit exit peripheries. In the preferred embodiment, flaring of the conduit exits is employed. Flaring provides a structural means to position the conduits within the housing, while permitting a gap to exist between the conduits within the flow path upstream of the exit, and provides a convenient method of cooling the positioning structure. Other structures could be employed and the invention should not be considered as requiring flared conduits.

In the preferred embodiment, the catalyst is backside cooled. Backside cooling means that the catalyst is positioned on a surface in heat exchange with another surface. In the case of the preferred embodiment where the catalyst is deposited on a conduit made of metal, a portion of the heat of reaction is conducted from the surface on which the catalyst is deposited to the opposite surface, which is in contact with the cooling fluid stream.

The requirement for backside cooling of the catalyst should not be considered as limiting the invention in the sense that only backside cooled catalyst is permitted. Non-backside cooled catalyst is permitted as long as a requisite material limit is not exceeded. Any catalytic means can be used to make the flow path catalytic, such as depositing catalyst (active ingredient) onto a surface (substrate), constructing a structure from a material containing a catalyst, constructing a structure from a catalytic material, or using pellets. In the preferred embodiment, the conduit is considered a substrate and the catalyst, active ingredient, is deposited on the exterior surface. Suitable catalyst are well known in the art.

A plenum could be added to the invention upstream of the aperture to provide further distribution of the fuel/air mixture prior to the mixture entering the manifold. If a plenum is employed multiple apertures would be desired. Where multiple apertures are used, the dispersion area of the flow path could be more restricted.

The second embodiment is in essence the first embodiment with a simplified structure. In the second embodiment, the requirement for a first zone and a plate are eliminated from the invention by modifying the housing. In this embodiment, the conduits merely penetrate the housing so that the conduit entrances open to an area that is not within the housing.

BRIEF DESCRIPTION OF THE DRAWINGS

FIG. 7 shows a longitudinal cross-section of the present invention depicting an unpartitioned flow path.

DETAILED DESCRIPTION OF THE INVENTION

Figure 1:
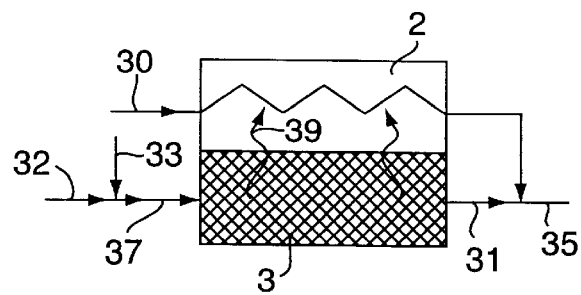
FIG. 1 is a schematic representation of the basic method of the present invention.

More particularly, there is shown in FIG. 1 a cooling fluid stream 30 comprising air entering a heat exchanger 2 while simultaneously a fuel-rich fuel/air mixture 37, comprised of a first fluid 32 comprising air and a first fuel 33, is entering catalyst 3. The first fuel 33 within fuel-rich fuel/air mixture 37 upon entering the catalyst 3 is partially oxidized creating a heat of reaction and a product stream 31. The cooling fluid stream 30 absorbs at least a portion of the heat of reaction 39. The resulting product stream 31 and cooling fluid stream 30 are then contacted creating non-homogenous mixture 35. A critical feature of this present method is that the cooling fluid stream 30 be of sufficient flow rate to create a fuel-lean fuel/air mixture if mixed with the product stream 31.

The cooling fluid stream 30 can absorb the heat of reaction through multiple mechanisms. One method is to use the cooling fluid to cool the catalyst and associated substrate, for example backside cooling. Another method would be to use a heat exchanger downstream of the catalyst.

Figure 2:
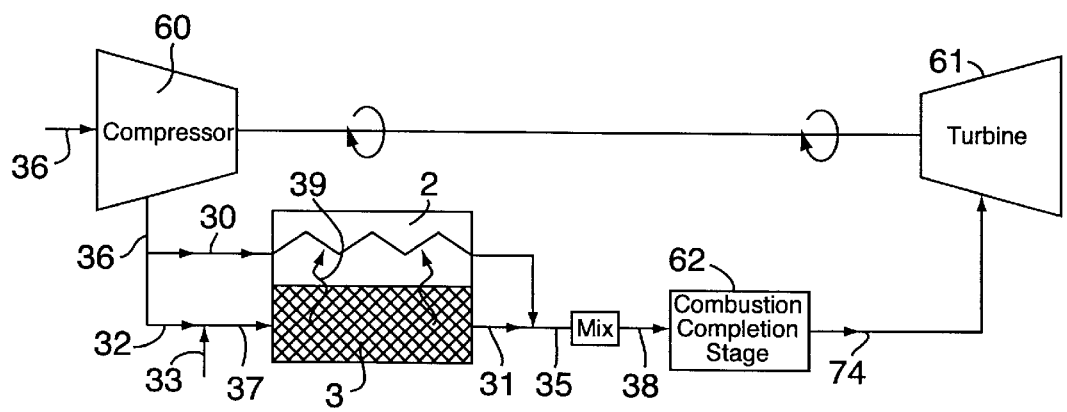
FIG. 2 is a schematic representation of the basic method of the present invention employed in a gas turbine.

FIG. 2 shows the general method described above in the specific application of a gas turbine. This specific application adds to the basic invention described above a mixing step and a gas-phase combustion step. An alternative application in a gas turbine could add to the basic invention a gas-phase combustion step without prior mixing.

In the gas turbine application shown, the compressor 60 compresses third fluid 36, which comprises air. The third fluid 36 is then split into two separate streams, first fluid 32 and cooling fluid stream 30. Fuel 33 is then mixed in sufficient quantity into first fluid 32 to create fuel-rich fuel/air mixture 37. Then as in the basic method, a portion of the fuel 33 within the fuel-rich fuel/air mixture 37 is then oxidized by catalyst 3 creating a heat of reaction and product stream 31. A portion of the heat of reaction 39 is extracted into cooling fluid stream 30 as it passes through the heat exchanger 2. The product stream 31 is then contacted with cooling fluid stream 30 to create non-homogenous mixture 35. Non-homogenous mixture 35 is then mixed to create fuel-lean fuel/air mixture 38. Fuel-lean fuel/air mixture 38 is then conducted into a combustion zone 62 where gas-phase combustion occurs. The resulting combustion products 74 are then conducted into turbine 61. In the gas turbine application, the third fluid 36 can be additionally used as a source for dilution air (not shown) upstream of turbine 61.

Mixing of non-homogenous mixture 35 to create fuel-lean fuel/air mixture 38 without premature inflammation requires that known flame holding methods be avoided. Use of the apparatus disclosed herein is advantageous.

Figure 3:
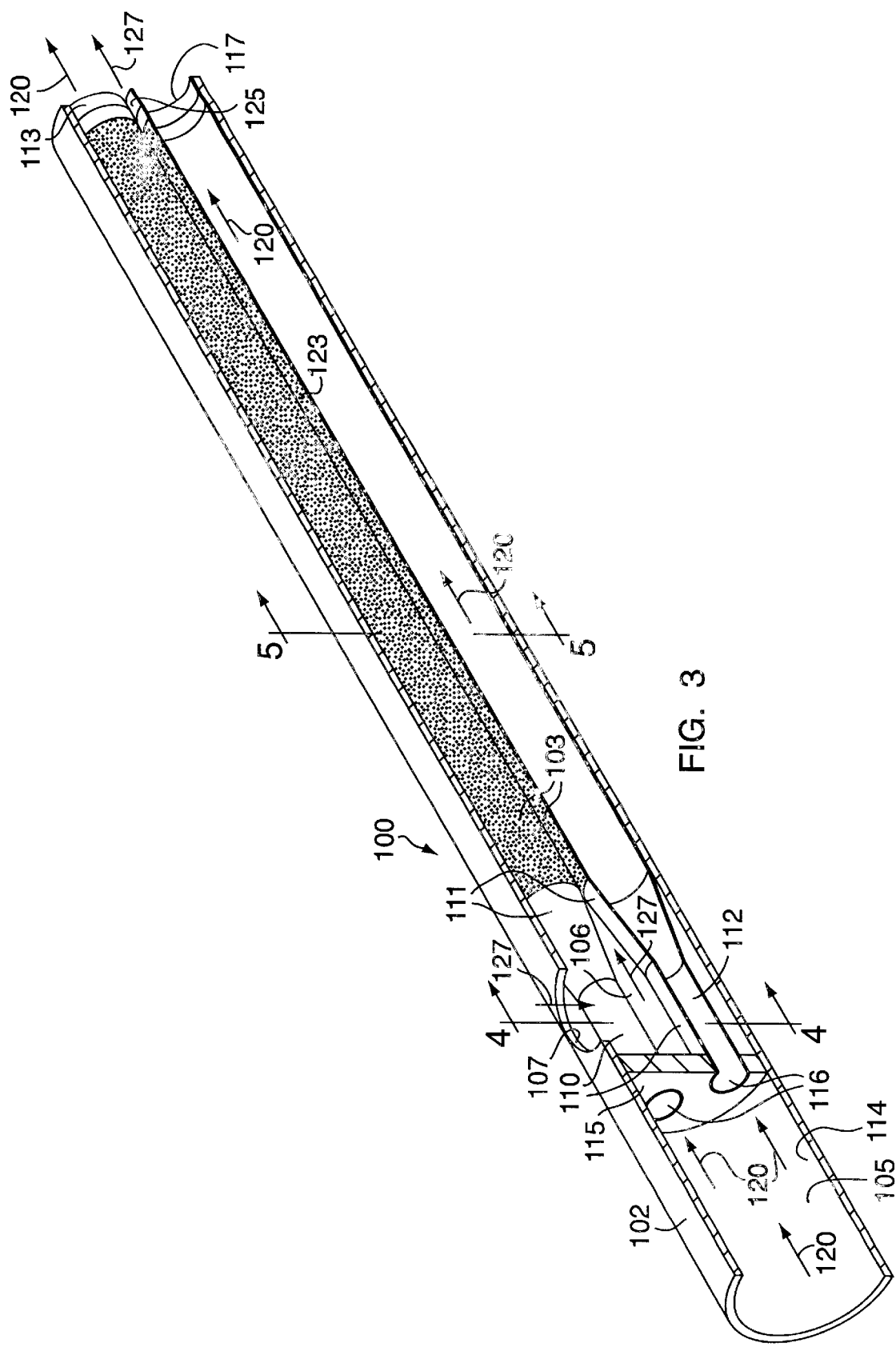
FIG. 3 shows a longitudinal cross-section of the first alternative embodiment of the present invention.

FIG. 3 shows a longitudinal cross-section of the first alternative embodiment of the present invention. In this embodiment, the apparatus comprises a catalytic reactor 100 comprised of a housing 102 having an entrance and an exit, and defining at least one aperture 107. A plate 115 is positioned within the housing 102 defining a first zone 105 and a second zone 106. The aperture 107 is in fluid communication with the second zone 106.

At least two conduits 110 made from a heat conducting material and adapted for conducting a fluid are positioned within the housing 102. The conduits have an entrance 116, an exit 117 with an exit periphery 113, an interior surface 112, and an exterior surface 111. The conduits 110 are positioned within the housing 102 such that the conduits 110 penetrate plate 115 thereby having the conduit entrances 116 in fluid communication with the first zone 105 and the conduit exits within the second zone 106. A first fluid 120 entering first zone 105 must enter second zone 106, if at all, by exiting conduits 110. The conduit exit periphery 113 positions the conduits 110 relative to each other and the housing interior surface 114.

The flow path 123 within housing 102 is defined by the conduit exterior surfaces 111. The flow path extends between the aperture 107 and the flow path exits, which are defined by the conduit exit peripheries 113. The flow path 123 can have numerous physical configurations that are application dependent. In general, the flow path must permit the diffusion of the entering second fluid 127 in a manner to ensure the second fluid 127 can enter all the passages containing catalyst downstream therefrom. Those skilled in the art will appreciate the numerous structures that can be designed based upon the specific application, thus the invention should not be considered limited to the flow paths depicted in the embodiments presented.

FIG. 3 depicts a partitioned flow path. Just downstream of the aperture 107, the flow path 123 allows for the second fluid 127 to disperse throughout housing 102. Further downstream however, the flow path has been subdivided into a plurality of smaller passages. Partitioned means that the fluid is essentially confined to the smaller passages. Partitioning is accomplished by physical means, such as a solid barrier or by contact (close proximity) of surfaces. In this embodiment, the subdivision into a plurality of small passages is accomplished by contact, expanding the cross-section of the conduits 110 so that they touch.

A catalyst 103 has been deposited on a portion of the conduit exterior surface 111. Catalyst can be deposited anywhere in the flow path. It is preferred that the catalyst be deposited downstream of aperture 107.

Figure 4:
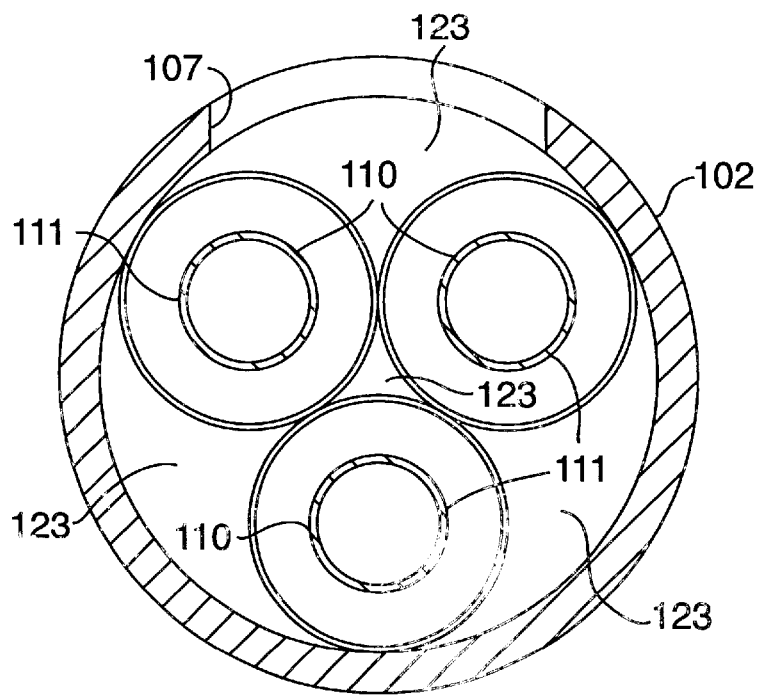
FIG. 4 shows a cross-sectional view of the flow path in the area of the aperture of the present invention depicted in FIG. 3 looking downstream.

FIG. 4 is a cross-sectional view of the housing 102 taken through aperture 107 looking downstream showing the definition of the flow path 123 by the conduit exterior surfaces 111 within housing 102. To allow a second fluid 127 upon entering the second zone to diffuse, the cross-sections of the conduits 110 are sized to permit the fluid to easily flow around the conduit exterior surfaces 111.

Figure 5:
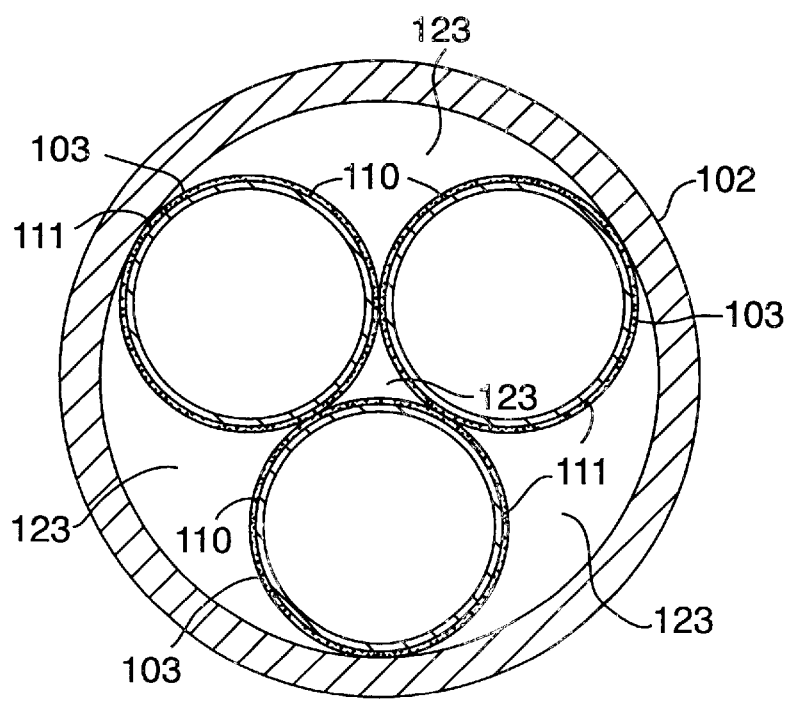
FIG. 5 shows a cross-sectional view of the flow path downstream of the aperture of the present invention depicted in FIG. 3 looking downstream.

As shown in FIG. 5, which is a cross-sectional view of the housing 102 approximately mid-way between the aperture 107 and the flow path exits 125, the conduit 110 cross-sections have been sized such that the conduit exterior surfaces covered with catalyst 103 touch, or nearly touch, one another or the housing interior surface 114. The sizing of the conduit 110 cross-sections in this manner effectively divides the flow path 123 into a plurality of passages.

Figure 6:
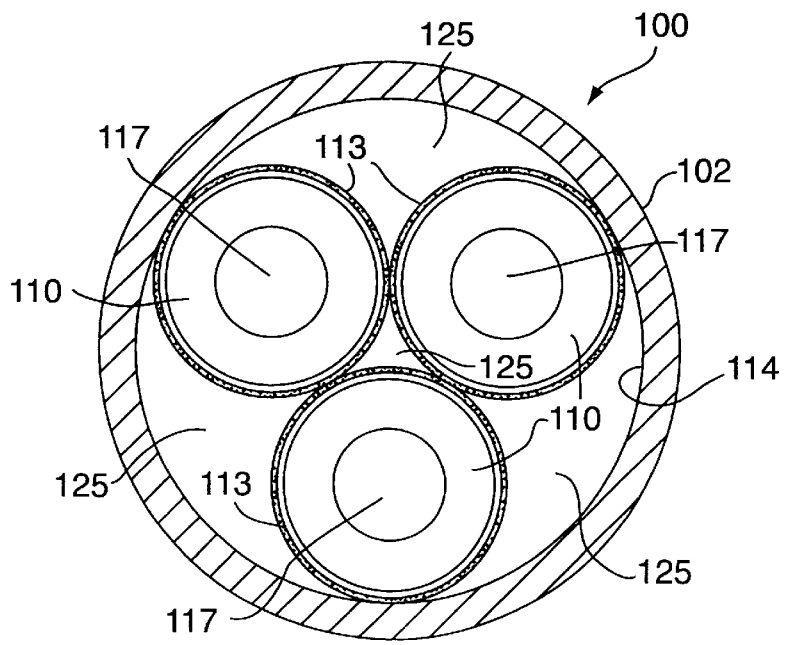
FIG. 6 shows an end view of the catalytic reactor at the reactor discharge looking upstream.

FIG. 6 shows an end view of the catalytic reactor 100 looking upstream from the discharge end of the catalytic reactor 100. The conduit exit peripheries 113 define the flow path exits 125 as well as assure the conduit exits 117 are interspersed with the flow path exits 125. In this embodiment, the conduit exit peripheries 113 provide the structure which holds the conduits 110 in position by contacting the housing interior surface 114 within the housing 102.

FIG. 7 shows a longitudinal cross-section of another embodiment of the present invention. This embodiment is the same as that depicted in FIG. 3 except that the flow path 123 is of a different configuration. In this embodiment, the flow path is unpartitioned. Unlike the embodiment depicted in FIG. 3, the conduit cross-sections are sized to allow the second fluid 127 to flow around the conduits throughout the entire length of the flow channel 123. The flow path after the initial dispersion area can be partitioned, unpartitioned, or a combination. In the embodiment shown in FIG. 7, the conduit exit peripheries 113 define the flow path exits 125 as well as assure the conduit exits 117 are interspersed with the flow path exits 125. In this embodiment, the conduit exit peripheries 113 provide the structure which holds the conduits 110 in position by contacting the housing interior surface 114 within the housing 102. While flares are shown, it is not required and the invention should not be considered so limited.

Figure 8:
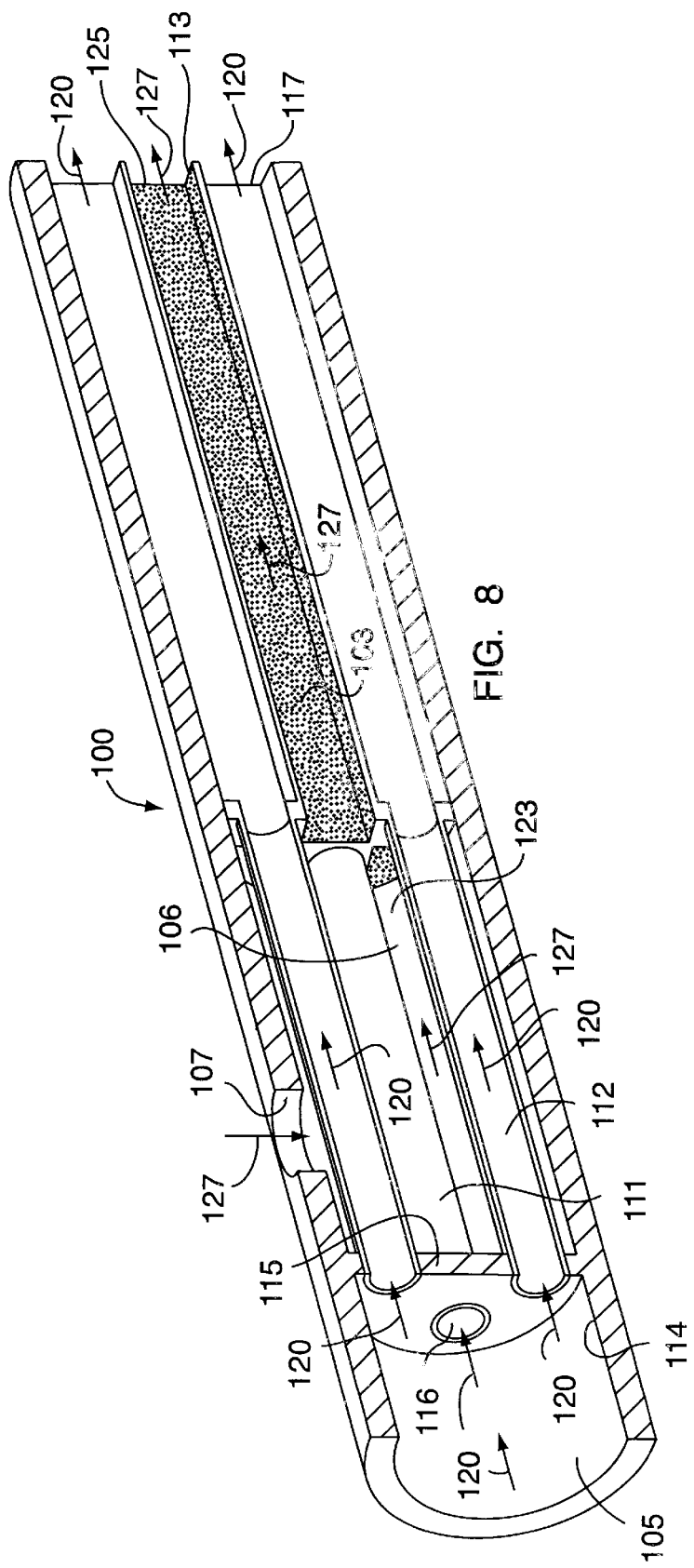
FIG. 8 shows a longitudinal cross-section of the present invention depicting a partitioned flow path.

FIG. 8 shows a longitudinal cross-section of another embodiment of the present invention. This embodiment is the same as that depicted in FIG. 3 except that the flow path 123 is partitioned by a physical barrier. The conduit exterior surfaces are integrated into a structure resembling a monolith. In this embodiment the flow path 123 is still considered defined by the conduit exterior surfaces 111, and the catalyst 103 is considered deposited thereon.

Figure 9:
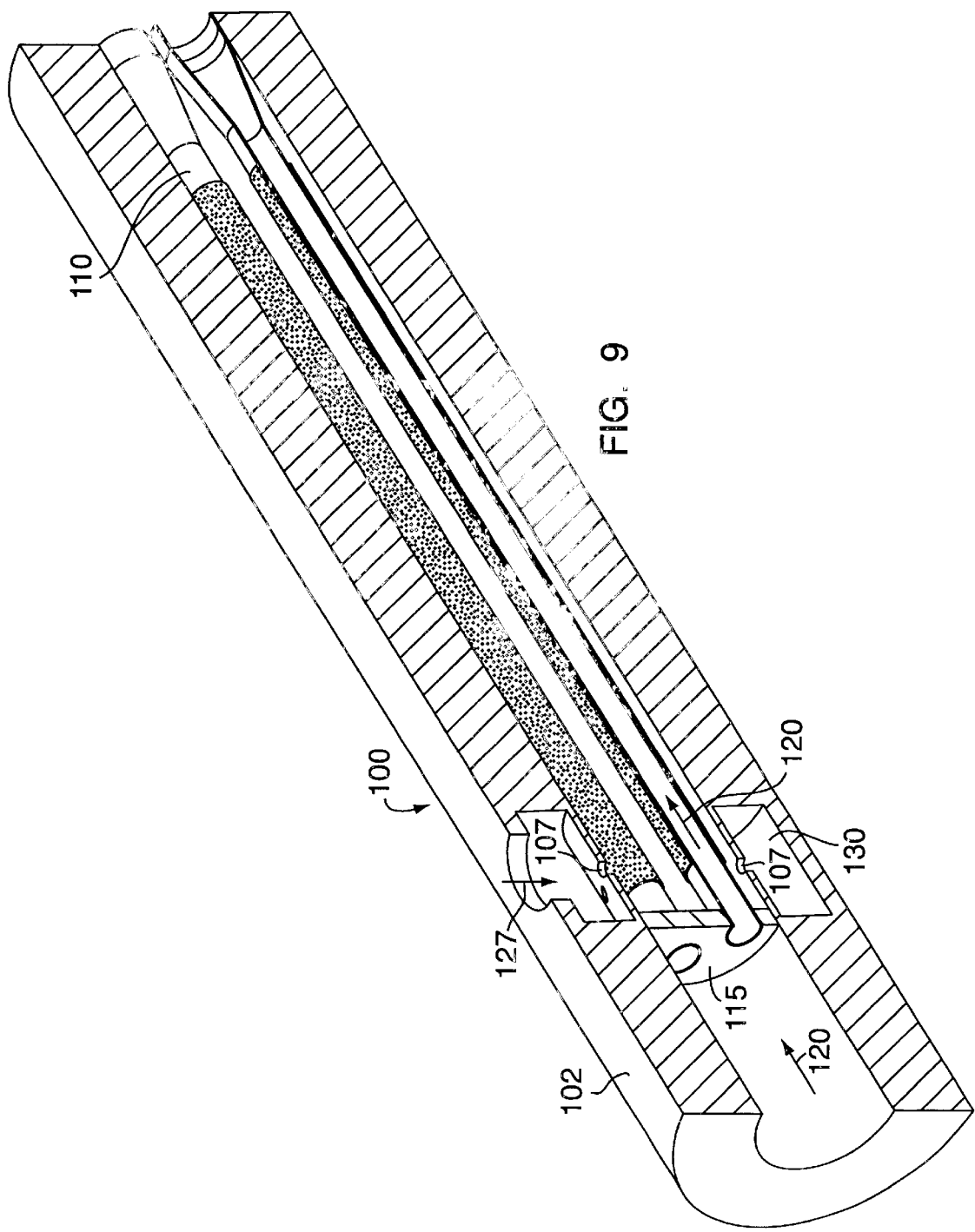
FIG. 9 shows a longitudinal cross-section of the present invention depicted in FIG. 3 with a plenum.

FIG. 9 shows a longitudinal cross-section of the embodiment depicted in FIG. 3 with a plenum 130 added upstream of the aperture 107 and in fluid communication therewith. If a plenum 130 is employed multiple apertures 107 are preferred. A plenum 130 can be incorporated into any of the previously discussed embodiments.

Figure 10:
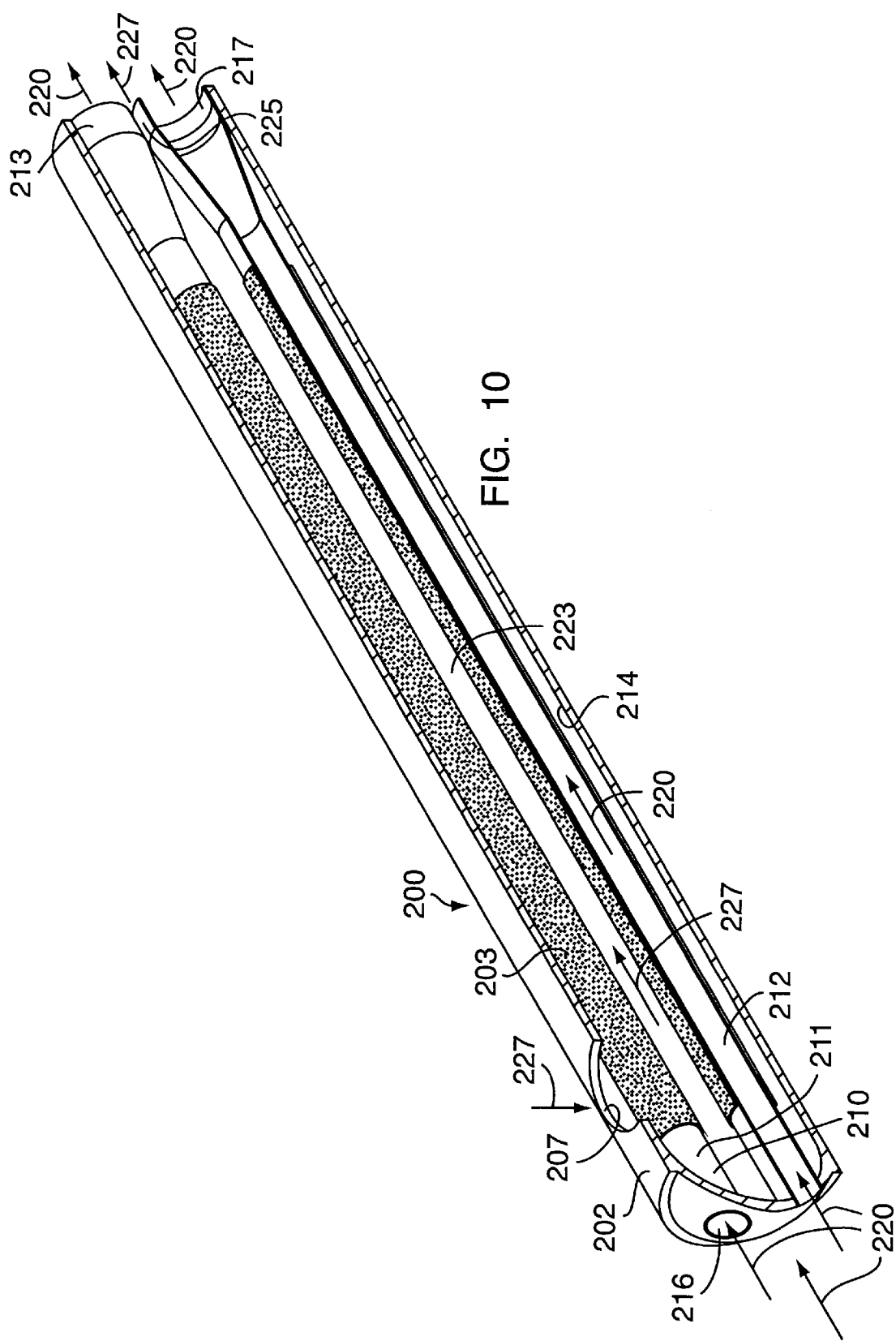
FIG. 10 shows a longitudinal cross-section of a second embodiment of the present invention.

FIG. 10 shows a longitudinal cross-section of another embodiment of the present invention very similar to that disclosed in FIG. 3. This embodiment, however, is based on a simplified housing structure. In this embodiment, the catalytic reactor 200 comprises a housing 202 having an exit, and defining at least one aperture 207.

At least two conduits 210 made from a heat conducting material and adapted for conducting a fluid are positioned within the housing 202. The conduits have an entrance 216, an exit 217 with an exit periphery 213, an interior surface 212, and an exterior surface 211. The conduits 210 are positioned within the housing 202 such that the conduits 210 penetrate the housing thereby having the conduit exits within the housing 202 and the conduit entrances 216 opening to an area outside the housing 202. A first fluid 220 entering conduits 210 enters housing 202, if at all, by exiting conduits 210. The conduit exit periphery 213 positions the conduits 210 relative to each other and the housing interior surface 214.

FIG. 10 depicts an unpartitioned flow path. This embodiment, however, has all the flexibility of the first embodiment. As with the first embodiment a plenum could also be incorporated.

For application in a gas turbine, the catalytic reactor must be integrated into the gas turbine combustion system. For gas turbine engines using a combustor shell to contain the high-pressure gases within the combustion section and to provide a sealed flow path from compressor exit to turbine inlet, the reactor housing is relieved of the need to contain high pressure. The fuel-rich fuel/air mixture advantageously should be uniformly mixed prior to delivery to the flow path. Mixing of fuel and air within the flow path is also feasible if the reactor is designed accordingly.

As a general design rule, it is desirable to design the catalytic reactor such that the catalytic reaction approaches its maximum possible extent at all expected operating conditions, so that variations in chemical reaction rates and mass transfer rates do not affect the catalytic reactor output. Thus, sufficient catalyst coating should be applied that $O_2$, the limiting reactant, is substantially consumed in the flow path. $O_2$ conversions greater than 50 percent are preferred, and $O_2$ conversions greater than 75 percent are most preferred.

Sufficient catalyst coating means sufficient loading, on a weight basis, as well as sufficient geometric surface area of catalyst. Insufficient loading will result in an insufficient number of catalytic reaction sites, and insufficient geometric surface area will result in insufficient total mass transfer from the gas-phase to the catalytic surface. In either case, insufficient catalyst means that $O_2$ conversions will be below the preferred levels. The required loading and the required geometric surface area will depend upon operating conditions (e.g. reactant temperature, pressure, velocity, composition) and catalyst activity, and can be determined by methods known in chemical engineering practice.

The catalyst coating used in the present invention, where the fuel is a hydrocarbon and oxygen is the oxidizer, may have as an active ingredient precious metals, group VIII noble metals, base metals, metal oxides, or any combination thereof. Elements such as zirconium, vanadium, chromium, manganese, copper, platinum, palladium, osmium, iridium, rhodium, cerium, lanthanum, other elements of the lanthanide series, cobalt, nickel, iron, and the like may be used. The catalyst may be applied directly to the substrate, or may be applied to an intermediate bond coat or washcoat composed of alumina, silica, zirconia, titania, magnesia, other refractory metal oxides, or any combination thereof.

The catalyst-coated substrate may be fabricated from any of various high temperature materials. High temperature metal alloys are preferred, particularly alloys composed of iron, nickel, and/or cobalt, in combination with aluminum, chromium, and/or other alloying materials. High temperature nickel alloys are especially preferred. Other materials which may be used include ceramics, metal oxides, intermetallic materials, carbides, and nitrides. Metallic substrates are most preferred due to their excellent thermal conductivity, allowing effective backside cooling of the catalyst.

Fuel types include hydrocarbons, hydrocarbon oxygenates, and blends thereof. Suitable gaseous fuels include natural gas, methane, and propane. Suitable liquid fuels include gasoline, kerosene, No. 1 heating oil, No. 2 heating oil, and conventional aviation turbine fuels such as Jet A, Jet B. JP-4, JP-5, JP-7, and JP-8. "Hydrocarbon" not only refers to organic compounds, including conventional liquid and gaseous fuels, but also to gas streams containing fuel values in the form of compounds such as carbon monoxide, organic compounds, or partial oxidation products of carbon containing compounds. If the fuel is a liquid, it should be vaporized or atomized before mixing with air or while being mixed with air.

EXAMPLE 1

A catalytic reactor similar to that illustrated in FIG. 9 was fabricated for dual air-source testing, with separate air flow controls for the flow path and the conduits. A single fuel source was employed. As shown in FIG. 9, a plenum supplied the fuel-rich fuel/air mixture to the flow path through multiple apertures. At the downstream end of the catalytic reactor, the product stream exited the flow path via the interstitial space created by the conduit peripheries. The cooling air exited the conduits at this same axial location, and mixed with the product stream.

The conduits, specifically tubes, were 10 inches in length with an outside diameter of 0.188 inches, and a material thickness of 0.010 inches. One end of the tube was expanded at a constant angle of 4 degrees until the cross-section was increased about 30 percent, to a final inside diameter of 0.255 inches. A flat segment was provided on the 0.255-inch-diameter flared section of about 0.1 inches length. The housing was sized such that seven tubes could be accommodated and positioned therein by the flares. The tubes were inserted through the plate and brazed thereto to form a tight seal.

A catalyst was deposited on approximately 8.5 inches of the exterior of the tubes. To prepare for catalyst application, an alumina washcoat was first applied, with a loading of approximately 20 to 40 mg/square-inch. Palladium catalyst was then applied to the washcoat, with a loading of approximately 10 to 15 mg/square-inch. There was some variation in both washcoat and catalyst loading.

The catalytic reactor was installed in a refractory-lined cylindrical pressure vessel to permit testing of the catalytic reactor at pressure. A fuel/air inlet pipe penetrated the vessel wall through a high-pressure fitting, and mated with a sealing fitting at the fuel/air inlet plenum of the catalytic reactor. Cooling air was supplied to the conduits by a separate line which entered the pressure vessel at its upstream end. Upon exiting the catalytic reactor, the combustible gas mixture (the combined product stream and the cooling stream) entered a 0.495-inch inside-diameter extension tube, followed by a nozzle block that tapered down to a 0.375-inch inside-diameter at its exit. The total length from the conduit exits to the downstream end of the nozzle block was approximately 15 inches. Immediately downstream of the nozzle block exit was a sudden expansion to a 3-inch-diameter burnout zone for combustion completion.

At 10 atm pressure, the catalytic reactor was operated at an inlet reference velocity of 250 ft/s. The inlet reference velocity is defined as the velocity which would result inside the catalytic reactor housing without the conduits. In other words, if all fuel and air entering the catalytic reactor (including both the conduit cooling air and the fuel-rich fuel/air mixture) were mixed before reaction to form an aggregate mixture at an aggregate temperature and mass flow rate, and if this aggregate mixture had a uniform velocity throughout the reactor, and if the conduits were of zero thickness, then the velocity inside the reactor housing would be 250 ft/s.

At the 10 atm, 250 ft/s inlet reference velocity condition, 10 percent of the total air was delivered to the flow path, and 90 percent of the total air was delivered to the conduits for cooling. The fuel flow rate was set to provide an overall 0.5 equivalence ratio in the fuel-lean fuel/air mixture downstream of the catalyst, giving an equivalence ratio of 5.0 for the fuel-rich fuel/air mixture. The cooling air was heated to 950 degrees F at the catalytic reactor inlet. The fuel-rich fuel/air mixture entered at room temperature (nominally 60 degrees F.). The resulting overall adiabatic flame temperature in the downstream burn-out zone was approximately 2800 degrees F. NOx emissions of less than 5 ppmv (corrected to 15 percent excess $O_2$ dry) were measured from the downstream sampling port (14 inches downstream of the sudden expansion plane), indicating that all burning took place in a well-mixed mode at flame temperatures in the vicinity of 2800 degrees F. As desired, there was no high-NOx-producing combustion during mixing of the cooling stream and the product stream. In this configuration at these conditions, the conduit exits act as multiple jets surrounded by a co-flowing product stream. The jets, nominally 0.255 inches in diameter, allowed rapid mixing at this small scale and helped to prevent ignition and burning of the reactants within the product stream before mixing was achieved. At the conditions given, the maximum catalyst substrate temperature was measured to be below approximately 1800 degrees F., which is below the substrate and catalyst material failure point. Gas sampling from the downstream end of the flow path indicated that approximately 90 percent of the $O_2$ present in the fuel-rich fuel/air mixture was consumed prior to exiting the flow path.

These results confirm that the method and apparatus of the present invention are capable, at gas-turbine-type operating conditions, of providing the desired result: fuel-rich catalytic reaction followed by stable, low-NOx gas-phase combustion, with well-moderated catalyst operating temperatures.

Although the invention has been described in considerable detail, it will be apparent that the invention is capable of numerous modifications and variations, apparent to those skilled in the art, without departing from the spirit and scope of the invention.

What is claimed is:

1. A catalytic reactor comprising:
  a) a housing having an entrance and an exit and an interior surface, the housing defining at least one aperture;
  b) a plate positioned within the housing defining a first zone and a second zone;
  c) at least two conduits made of a heat conducting material and adapted for conducting a fluid, the conduit having an entrance, an exit with a periphery and an exterior surface, the conduits positioned within the housing, such that:
    the conduits penetrate the plate whereby the conduit exits are in the second zone and the conduit entrances open into the first zone, the conduit exterior surfaces within the second zone and the housing interior surface within the second zone defining a flow path, the conduit exit peripheries defining at least one flow path exit, the conduit exits and the flow path exit being proximately located and interspersed, the flow path being in fluid communication with the aperture; and d) catalytic means for making at least a portion of the flow path catalytically active.

2. The apparatus of claim 1 wherein the flow path is unobstructed.

3. The apparatus of claim 2 wherein the conduit has an interior surface, and the catalytic means is positioned on at least portion of at least one of the exterior surfaces such that there is a heat exchange relationship with the interior surface.

4. The apparatus of claim 1 wherein the flow path downstream of the aperture is comprised of a plurality of channels.

5. The apparatus of claim 4 wherein the conduit has an interior surface, and the catalytic means is positioned on at least portion of at least one of the exterior surfaces such that there is a heat exchange relationship with the interior surface.

6. The apparatus of claim 1 further comprising a plenum positioned upstream of the aperture in fluid communication therewith.

7. The apparatus of claim 1 wherein the conduit has an interior surface, and the catalytic means is positioned on at least portion of at least one of the exterior surfaces such that there is a heat exchange relationship with the interior surface.

8. The apparatus of claim 7 wherein the flow path is unobstructed.

9. The apparatus of claim 7 wherein flow path downstream of the aperture is comprised of a plurality of channels.

10. A catalytic reactor comprising:

a) a housing having an exit, the housing defining at least one aperture;

b) at least two conduits made of a heat conducting material and adapted for conducting a first fluid, the conduit having an entrance, an exit with a periphery and an exterior surface, the conduits positioned within the housing, such that:

the conduits penetrate through the housing whereby the conduit exits are within the housing, the conduit exterior surfaces within the housing defining a flow path, the conduit exit peripheries defining at least one flow path exit, the conduit exits and the flow path exit being proximately located and interspersed, the flow path being in fluid communication with the aperture; and c) means for making at least a portion of the flow path means catalytically active.

11. The apparatus of claim 10 wherein the flow path is unobstructed.

12. The apparatus of claim 11 wherein the conduit has an interior surface, and the catalytic means is positioned on at least portion of at least one of the exterior surfaces such that there is a heat exchange relationship with the interior surface.

13. The apparatus of claim 10 wherein the flow path downstream of the aperture is comprised of a plurality of channels.

14. The apparatus of claim 13 wherein the conduit has an interior surface, and the catalytic means is positioned on at least portion of at least one of the exterior surfaces such that there is a heat exchange relationship with the interior surface.

15. The apparatus of claim 10 further comprising a plenum positioned upstream of the aperture in fluid communication therewith.

16. The apparatus of claim 10 wherein the conduit has an interior surface, and the catalytic means is positioned on at least portion of at least one of the exterior surfaces such that there is a heat exchange relationship with the interior surface.

17. The apparatus of claim 16 wherein the flow path is unobstructed.

18. The apparatus of claim 16 wherein flow path downstream of the aperture is comprised of a plurality of channels.

* * * * *

UNITED STATES PATENT AND TRADEMARK OFFICE
CERTIFICATE OF CORRECTION

PATENT NO. : 6,394,791 B2
DATED : May 28, 2002
INVENTOR(S) : Lance L. Smith et al.

It is certified that error appears in the above-identified patent and that said Letters Patent is hereby corrected as shown below:

<u>Title page,</u>
Before BACKGROUND OF THE INVENTION please insert:

-- GOVERNMENT RIGHTS
This invention was made with U.S. government support under DE-FG02-98CH10939 awarded by the U.S. Department of Energy. The U.S. government has certain rights in this invention. --

Signed and Sealed this

Third Day of December, 2002

JAMES E. ROGAN
*Director of the United States Patent and Trademark Office*